United States Patent
Berman

[19]

[11] Patent Number: 6,108,093
[45] Date of Patent: *Aug. 22, 2000

[54] AUTOMATED INSPECTION SYSTEM FOR RESIDUAL METAL AFTER CHEMICAL-MECHANICAL POLISHING

[75] Inventor: Michael J. Berman, West Linn, Oreg.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,278

[22] Filed: Jun. 4, 1997

[51] Int. Cl.$^7$ .................................................. G01B 11/00
[52] U.S. Cl. ............................................. 356/394; 451/41
[58] Field of Search .................................. 356/371, 376, 356/381, 445, 394; 438/4, 693, 633; 451/41, 287, 288, 504, 505, 56; 156/636.1, 645.1; 216/89; 106/3

[56] References Cited

U.S. PATENT DOCUMENTS

| | | |
|---|---|---|
| 4,772,127 | 9/1988 | Chase et al. . |
| 4,793,895 | 12/1988 | Kaanta et al. . |
| 4,794,264 | 12/1988 | Quackenbos et al. . |
| 4,898,471 | 2/1990 | Stonestrom et al. . |
| 4,943,734 | 7/1990 | Johnson et al. . |
| 5,032,217 | 7/1991 | Tanaka ..................................... 156/640 |
| 5,036,015 | 7/1991 | Sandhu et al. . |
| 5,049,816 | 9/1991 | Moslehi ................................... 324/158 |
| 5,058,982 | 10/1991 | Katzir . |
| 5,076,692 | 12/1991 | Neukermans et al. . |
| 5,081,421 | 1/1992 | Miller et al. . |
| 5,151,584 | 9/1992 | Ebbing et al. . |
| 5,153,668 | 10/1992 | Katzir et al. . |
| 5,169,491 | 12/1992 | Doan . |
| 5,196,353 | 3/1993 | Sandu et al. . |
| 5,222,329 | 6/1993 | Yu . |
| 5,240,552 | 8/1993 | Yu et al. . |
| 5,245,790 | 9/1993 | Jerbic . |
| 5,245,794 | 9/1993 | Salugsugan . |
| 5,265,378 | 11/1993 | Rostoker . |
| 5,272,115 | 12/1993 | Sato . |
| 5,308,438 | 5/1994 | Cote et al. . |
| 5,310,455 | 5/1994 | Pasch et al. . |
| 5,321,304 | 6/1994 | Rostoker . |
| 5,337,015 | 8/1994 | Lustig et al. . |
| 5,355,212 | 10/1994 | Wells et al. . |
| 5,389,194 | 2/1995 | Rostoker et al. . |
| 5,389,794 | 2/1995 | Allen et al. . |
| 5,399,234 | 3/1995 | Yu et al. . |
| 5,403,228 | 4/1995 | Pasch . |
| 5,405,806 | 4/1995 | Pfiester et al. . |
| 5,439,551 | 8/1995 | Meikle et al. . |
| 5,483,568 | 1/1996 | Yano et al. . |
| 5,492,594 | 2/1996 | Burke et al. . |
| 5,516,400 | 5/1996 | Pasch et al. . |
| 5,531,861 | 7/1996 | Yu et al. . |
| 5,559,428 | 9/1996 | Li et al. . |
| 5,561,541 | 10/1996 | Sharp et al. . |
| 5,563,702 | 10/1996 | Emery et al. . |
| 5,572,598 | 11/1996 | Wihl et al. . |
| 5,595,526 | 1/1997 | Yau et al. . |
| 5,597,442 | 1/1997 | Chen et al. . |
| 5,609,511 | 3/1997 | Moriyama et al. . |

(List continued on next page.)

Primary Examiner—Robert H. Kim
Assistant Examiner—Tu T. Nguyen
Attorney, Agent, or Firm—Beyer Weaver & Thomas

[57] ABSTRACT

An automated endpoint detection process for detecting residual metal on a surface of an integrated circuit substrate after subjecting said surface to a chemical-mechanical polishing process is described. The process includes obtaining a baseline reflected radiation signal for a surface on a standard integrated circuit substrate surface that is substantially free of residual metal, directing radiation generated from a radiation source on at least a portion of the surface of the integrated circuit substrate, detecting a resulting reflected radiation signal from the surface of the integrated circuit substrate and comparing the reflected radiation signal to the baseline reflected radiation signal and thereby determining whether residual metal is present on the surface of the integrated circuit substrate.

32 Claims, 6 Drawing Sheets

U.S. PATENT DOCUMENTS

| | | |
|---|---|---|
| 5,624,304 | 4/1997 | Pasch et al. . |
| 5,626,715 | 5/1997 | Rostoker . |
| 5,639,388 | 6/1997 | Kimura et al. . |
| 5,643,046 | 7/1997 | Katakabe et al. . |
| 5,643,050 | 7/1997 | Chen . |
| 5,644,221 | 7/1997 | Li et al. . |
| 5,647,952 | 7/1997 | Chen . |
| 5,658,183 | 8/1997 | Sandhu et al. . |
| 5,660,672 | 8/1997 | Li et al. . |
| 5,663,797 | 9/1997 | Sandu . |
| 5,664,987 | 9/1997 | Renteln . |
| 5,667,424 | 9/1997 | Pan . |
| 5,667,433 | 9/1997 | Mallon . |
| 5,667,629 | 9/1997 | Pan et al. . |
| 5,668,063 | 9/1997 | Fry et al. . |
| 5,670,410 | 9/1997 | Pan . |
| 5,672,091 | 9/1997 | Takahashi et al. . |
| 5,674,784 | 10/1997 | Jang et al. . |
| 5,695,660 | 12/1997 | Litvak . |
| 5,700,180 | 12/1997 | Sandhu et al. . |
| 5,705,435 | 1/1998 | Chen . |
| 5,708,506 | 1/1998 | Birang .................................. 356/371 |
| 5,710,076 | 1/1998 | Dai et al. . |
| 5,712,185 | 1/1998 | Tsai et al. . |
| 5,722,875 | 3/1998 | Iwashita et al. . |
| 5,741,171 | 4/1998 | Sarfaty et al. . |
| 5,777,739 | 7/1998 | Sandhu et al. . |
| 5,835,225 | 11/1998 | Thakur .................................. 356/381 |
| 5,861,055 | 1/1999 | Allman et al. . |
| 5,865,666 | 2/1999 | Nagahara . |
| 5,868,608 | 2/1999 | Allman et al. . |
| 5,882,251 | 3/1999 | Berman et al. . |
| 5,888,120 | 3/1999 | Doran . |
| 5,893,756 | 4/1999 | Berman et al. . |
| 5,931,719 | 8/1999 | Nagahara et al. . |
| 5,948,697 | 9/1999 | Hata . |
| 5,957,757 | 9/1999 | Berman . |

AUTOMATED INSPECTION SYSTEM FOR RESIDUAL METAL AFTER CHEMICAL-MECHANICAL POLISHING

BACKGROUND OF THE INVENTION

The present invention relates to automated endpoint detection systems after chemical-mechanical polishing (commonly known in the art as "CMP") of an integrated circuit substrate. More particularly, the present invention relates to automated endpoint detection systems that employ radiation sources to test for residual metal on an integrated circuit substrate.

CMP typically involves mounting a semiconductor wafer, face down on a holder, and rotating the wafer against a polishing pad mounted on a platen, which in turn is rotating or is in orbital state. A slurry containing a chemical that chemically interacts with the facing wafer layer and an abrasive that physically removes that layer is flowed between the wafer and the polishing pad or on the pad near the wafer. This technique is commonly applied to planarize metallization layers in the semiconductor wafer.

An endpoint determination mechanism currently employed during CMP to determine a polishing endpoint of a wafer layer includes a motor current measuring mechanism, as disclosed in U.S. Pat. No. 5,308,438, which is incorporated herein by reference in its entirety for all purposes. Briefly, according to this patent, the endpoint determination mechanism includes a motor, which rotates the wafer against a polishing pad. Tower required to maintain a set rotational speed in the rotating motor changes (sometimes significantly) when a layer is removed from the wafer surface and a new wafer layer is being polished. In other words, as a layer is removed from the wafer surface, the amount of current being drawn by the motor changes due to the change in the frictional force induced by the changing wafer surface. Thus, by measuring the change in the current being drawn by the motor during polishing, the CMP endpoint of a wafer layer may be determined.

Endpoint determination using the motor current measuring mechanism, however, is imprecise as it only provides an average signal, i.e. the motor current is not sensitive to the full surface of the wafer area during the monitoring of the polishing process. FIG. 1 shows the surface of a semiconductor wafer 100 that may result when the endpoint for CMP is determined by employing a motor current. As shown in FIG. 1, a plurality of die (or integrated circuits) 102 are formed on the surface of wafer 100, which has residual metal regions 104 that are large enough, i.e. on the order of several square millimeters, to cover several of die 102. Residual metal regions 104 represent underpolished or not completely polished metallization regions of the wafer surface that render several die inoperable.

To remedy this problem, the current integrated circuit fabrication processes employ visual inspection systems, such as microscopes, scanning electron microscopes (SEMs) and automatic machines, to precisely examine the wafer surface for the presence of such residual metal regions. If residual metal is detected by such systems, the wafer surface is subjected to CMP again and the entire process described above is repeated until the wafer is substantially free of residual metal.

Unfortunately, the current processes suffer from several drawbacks. By way of example, equipment employed in implementing such inspection systems is complex and expensive, e.g., current visual inspection systems may cost up to about 2.5 million dollars. Further, the entire inspection process can be a cumbersome and labor intensive task, e.g., some processes require an operator to monitor and carry out the inspection process. As another example, the current processes are also time consuming, e.g., for 200 mm wafers, the current visual inspection systems may require at least about 4 minutes per wafer. This translates into a lower throughput for the CMP process. As yet another example, based on the findings during wafer inspection, it takes a long time to provide feedback to the CMP process for modifying the settings of the polishing parameters, e.g., the polishing time per wafer, etc.

What is therefore needed is an improved system for detecting residual metal on an integrated circuit substrate without incurring the high expenditure, low throughput and long feedback time associated with the current visual inspection systems.

SUMMARY OF THE INVENTION

To achieve the foregoing, the present invention provides an automated endpoint detection process for detecting residual metal on a surface of an integrated circuit (IC) substrate after subjecting the surface to chemical-mechanical polishing. The process includes obtaining a baseline reflected radiation signal for a surface on a standard integrated circuit (IC) substrate that is substantially free of residual metal, directing radiation generated from a radiation source on at least a portion of the surface of the IC substrate, detecting a resulting reflected radiation signal from the IC substrate surface and comparing the reflected radiation signal to the baseline reflected radiation signal and thereby determining whether residual metal is present on the surface of the IC substrate.

The endpoint detection process of the present invention may further include subjecting the surface of the IC substrate to an additional chemical-mechanical polishing process, if the reflected radiation signal is higher than the baseline reflected radiation signal. The process may further still include providing feedback to the chemical-mechanical process for polishing parameter settings after the step of comparing the reflected radiation signal to the baseline reflected radiation signal. The steps of directing radiation and detecting the reflected radiation signal may require a period of time that is on the order of a few milliseconds. In one embodiment of the present invention, the process includes a step of drying the surface of the IC substrate in a spin, rinse, dry station of a wafer scrubber before the step of directing radiation. In this embodiment, the step of directing radiation may be implemented by automatically energizing the radiation source in the spin, rinse, dry station of the wafer scrubber, where the IC substrate is secured on a chuck.

The step of comparing the radiation signal to the baseline radiation signal may be facilitated by a computer system. In one embodiment of the present invention, the step of obtaining a baseline radiation signal may be conducted before the chemical-mechanical polishing process. The radiation source employed in the detection process described above may include an infrared radiation source and the step of detecting may include using a radiation detector, such as an infrared radiation detector. The IC substrate may include a semiconductor wafer. In one embodiment of the present invention, the process includes securing the IC substrate on a robotic arm, while the steps of directing radiation and detecting the reflected radiation signal mentioned above are carried out. The robotic arm, in this embodiment, may be employed to transfer the IC substrate from one cassette containing a plurality of substantially dry IC substrates to a second cassette for holding a plurality of IC substrates. The step of obtaining a baseline reflected radiation signal may include providing radiation to the surface of the standard IC substrate that is substantially free of residual metal, detecting the baseline reflected radiation signal from the surface of the IC substrate, and storing the baseline reflected radiation signal from the surface of the IC substrate on machine readable media.

In another aspect, the present invention provides another automated endpoint detection process for detecting residual metal on a surface of an IC substrate after subjecting the surface to chemical-mechanical polishing. The process includes obtaining a baseline transmitted radiation signal for a standard IC substrate that is substantially free of residual metal, transmitting radiation generated by a radiation source through the IC substrate, detecting a transmitted radiation signal from the active surface of the IC substrate, and comparing the transmitted radiation signal to the baseline transmitted radiation signal and thereby determining whether residual metal is present on the surface of the IC substrate.

The radiation source may include an infrared radiation source and the step of detecting includes using a detector, such as an infrared radiation detector. The infrared radiation source may be positioned below the surface of the IC substrate such that radiation directed at another surface (which is opposite to the active surface), may be transmitted through the IC substrate. The IC substrate may include a semiconductor wafer.

The endpoint detection process may further include subjecting the surface of the IC substrate to an additional chemical-mechanical polishing process, if the transmitted radiation signal is lower than the baseline transmitted radiation signal. The step of obtaining the baseline transmitted radiation signal may include providing radiation to another surface, which is opposite to the active surface of the standard IC substrate that is substantially free of residual metal, detecting the baseline transmitted radiation signal through the surface of the IC substrate, and storing the baseline transmitted radiation signal through the surface of the IC substrate on machine readable media.

In yet another aspect, the present invention provides an apparatus for detecting residual metal on an IC substrate. The apparatus includes a housing, a radiation source for generating radiation on at least a portion of a surface of the IC substrate, and a radiation detector for detecting a reflected or transmitted radiation signal from the substrate surface. The radiation source and the radiation detector are appropriately positioned inside the housing such that radiation generated and incident upon the substrate is reflected or transmitted from the substrate surface and detected by the radiation detector.

The apparatus may further include a band pass filter positioned between the IC substrate and the detector such that a reflected or transmitted radiation signal passes through the band pass filter before reaching the detector. The apparatus may further still include deflectors that are positioned appropriately at the sides of the radiation source ensuring that a substantial amount of radiation from the radiation source is incident upon the IC substrate. The apparatus may further still include an interface electronics assembly for automatically energizing the radiation source.

In one embodiment of the present invention, the radiation source and the radiation detector are appropriately positioned above an active surface of the IC substrate such that radiation incident upon the active surface reflects off the surface and the resulting reflected radiation signal is detected by the radiation detector. Alternatively, in an another embodiment, the radiation source of the present invention is appropriately positioned below the active surface of the IC substrate such that radiation incident upon another surface (which is opposite the active surface) of the IC substrate is transmitted through the surface of the IC substrate and the transmitted radiation signal is detected by the radiation detector. The apparatus of the present invention may be integrated into a wafer scrubber system by making minor modifications. In one embodiment, the housing of the present invention may include a spin, rinse, dry station of the wafer scrubber system.

In yet another aspect, the present invention provides an apparatus for detecting residual metal on an IC substrate. The apparatus includes a housing, means for generating radiation on at least a portion of a surface of the IC substrate, and means for detecting a reflected or transmitted radiation signal from the substrate surface. The means for generating radiation and the means for detecting are appropriately positioned inside the housing such that radiation generated by the means for generating radiation is incident upon the substrate and the resulting reflected or transmitted radiation signal from the substrate is detected by the means for detecting. The apparatus may further include means for filtering the reflected or transmitted radiation signal before it reaches the means for detecting. The apparatus may further still include means for deflecting the radiation generated from the means for generating to ensure that a substantial amount of radiation is incident upon the IC substrate.

The housing may include a spin, rinse, dry station. In one embodiment of the present invention, the means for generating and the means for detecting are appropriately positioned above an active surface of the IC substrate such that radiation incident upon the active surface reflects off the surface and the resulting reflected radiation signal is detected by the means for detecting. Alternatively, in another embodiment of the present invention, the means for generating radiation is appropriately positioned below the active surface of the IC substrate such that radiation incident upon another surface (which is opposite the active surface of the IC substrate) is transmitted through the active surface of the IC substrate and the transmitted radiation signal is detected by the means for detecting.

The endpoint detection processes of the present invention represents a marked improvement over the current endpoint detection processes. By way of example, the present invention essentially requires a radiation source and a detector, which are relatively inexpensive and easy to implement. Such equipment can be easily integrated into post CMP cleaning equipment, e.g. wafer scrubber systems as shown in FIG. 3, with minor modifications. The automated features of the present invention also eliminate the need for an operator for monitoring the inspection process. As another example, detecting for residual metal regions according to the present invention requires only a few milliseconds compared to about 4 minutes/wafer required for a 200 mm wafer in current endpoint detection processes. As yet another example, because the time required for detecting residual metal regions is significantly shortened, the feedback time for the CMP process in the present invention is drastically reduced compared to current processes.

These and other features of the present invention will be described in more detail below in the detailed description of the invention and in conjunction with the following figures.

DETAILED DESCRIPTION OF THE PREFERRED EMBODIMENTS

The present invention provides an automated endpoint detection system for chemical-mechanical polishing (CMP) that employs radiation sources to test for residual metal on an integrated circuit (IC). In the following description, numerous specific details are set forth in order to fully illustrate a preferred embodiment of the present invention. It will be apparent, however, that the present invention may be practiced without limitation to some specific details presented herein.

While intending not to be bound by theory, the present invention recognizes that metals and silicon reflect and transmit radiation differently. Infrared radiation, for example, passes through a silicon layer, but reflects off a metal layer. The present invention, therefore, uses radiation sources and detectors to measure either a baseline reflected or transmitted radiation signal from a standard integrated circuit (IC) substrate that is free of residual metal. The baseline reflected or transmitted radiation signal is then compared to the reflected or transmitted radiation signal from a production IC substrate to determine whether residual metal is present on the production substrate. If residual metal is detected, then the production substrate is subjected to CMP again. If, however, no or almost no residual metal is detected, then the endpoint of the CMP process is achieved and the production substrate may proceed to the next step in IC fabrication.

Figure 1:
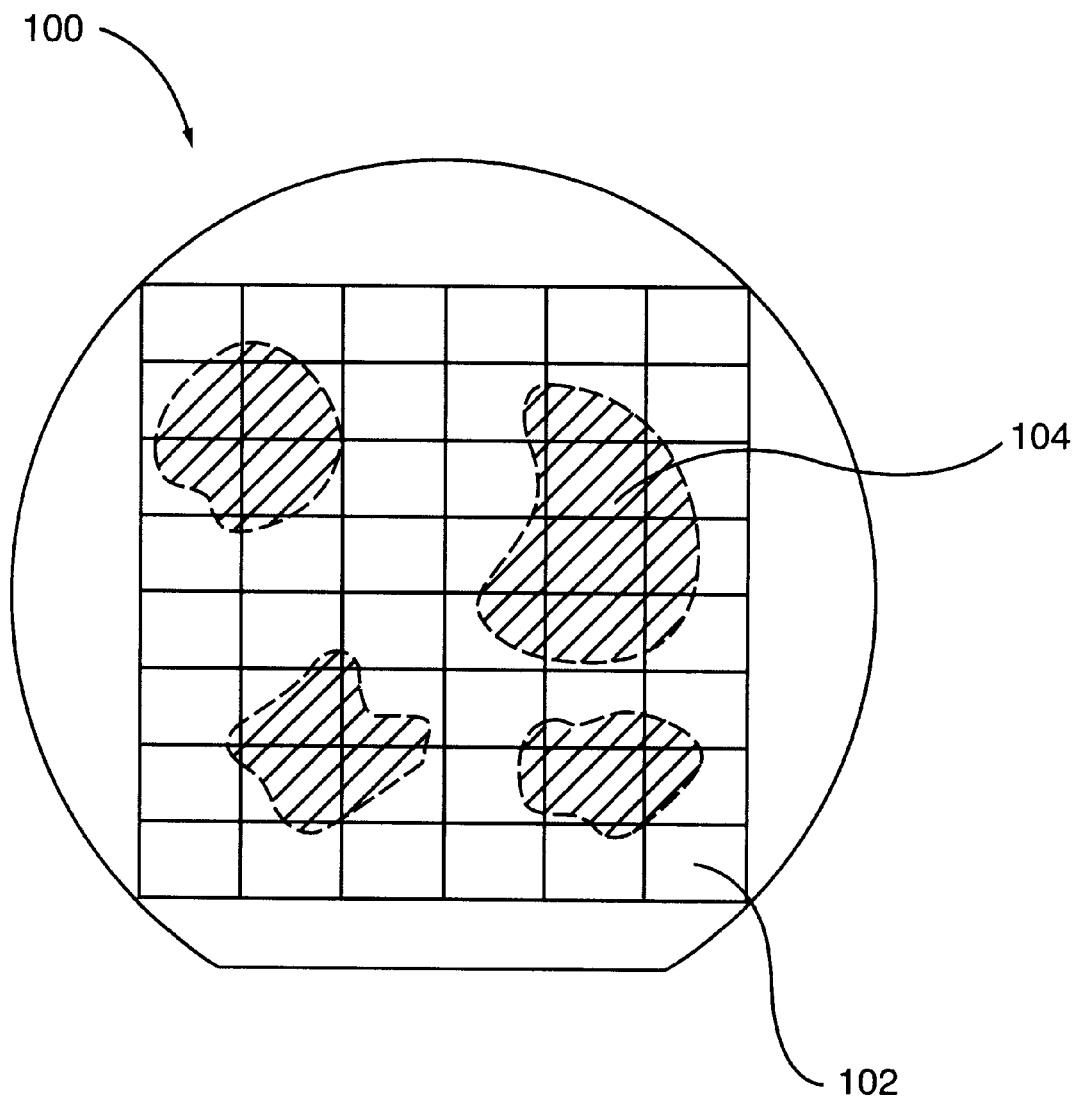
FIG. 1 is a top view of a semiconductor wafer surface having residual metal regions, which are formed when a motor current measuring mechanism determines the endpoint of a chemical-mechanical polishing process.
Figure 2A:
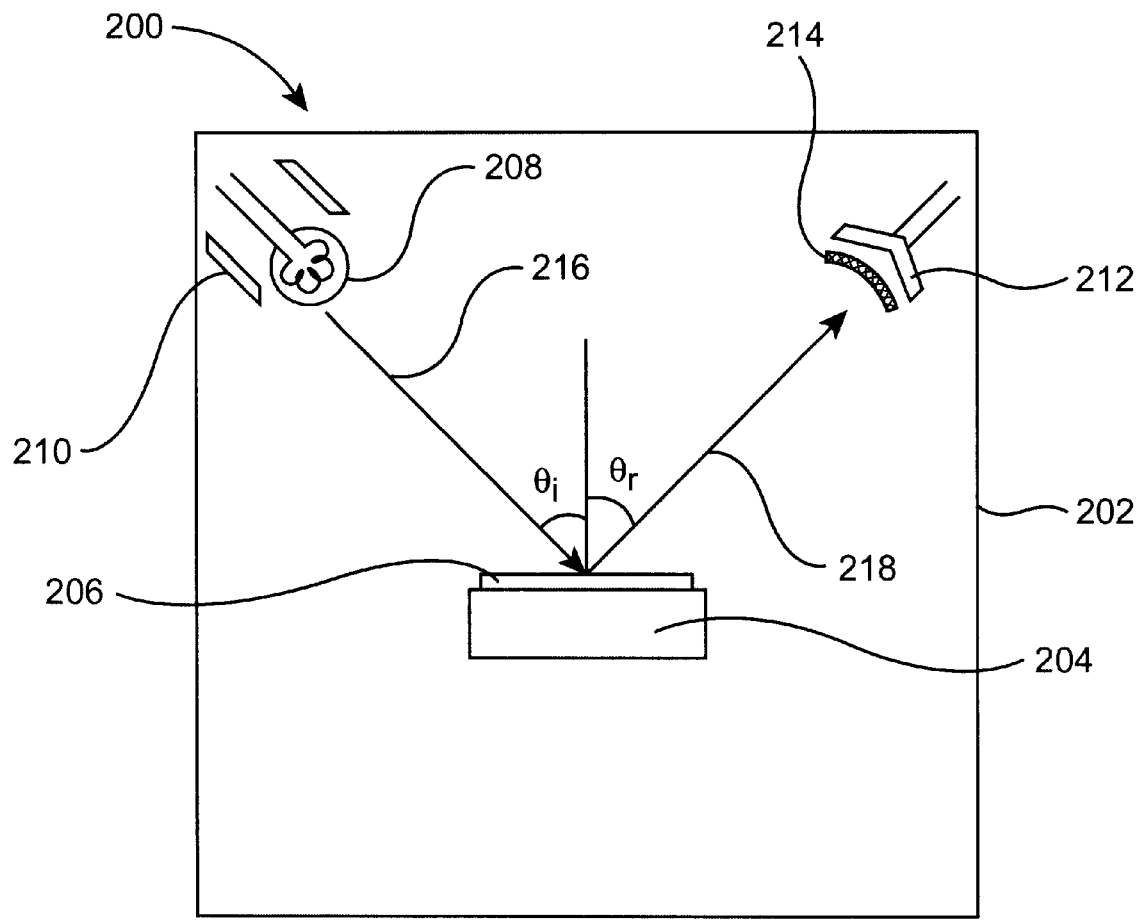
FIG. 2A shows an endpoint detection apparatus, which detects a reflected radiation signal, according to one embodiment of the present invention.

FIG. 2A shows an endpoint detection apparatus 200, according to one embodiment of the present invention, for detecting the presence of residual metal regions on an IC substrate surface by measuring the reflected radiation signal from the substrate surface. Apparatus 200 includes a housing 202 having a radiation source 208 fitted with deflectors 210 and a reflected radiation signal detector 212 positioned above a chuck 204, which is capable of securing an IC substrate 206. A band pass filter 214 is placed between radiation signal detector 212 and IC substrate 206 to filter out the ambient noise level in the reflected radiation signal during detection.

According to the present invention, before endpoint detection apparatus 200 begins detecting for residual metal, IC substrate 206 is secured on chuck 204 such that an active surface, including the die components, is facing up. Radiation source 208 is then energized and deflectors 210 ensure that a substantial amount of radiation 216 is incident upon the surface of IC substrate 206 to illuminate the substrate surface. A resulting reflected radiation signal 218 is then reflected off the substrate surface and filtered through band pass filter 214 before it is detected by reflected radiation signal detector 212. Those skilled in the art will recognize that the angle of the reflected radiation signal, $\theta_r$, is equal to the angle of incident radiation, $\theta_i$.

Figure 2B:
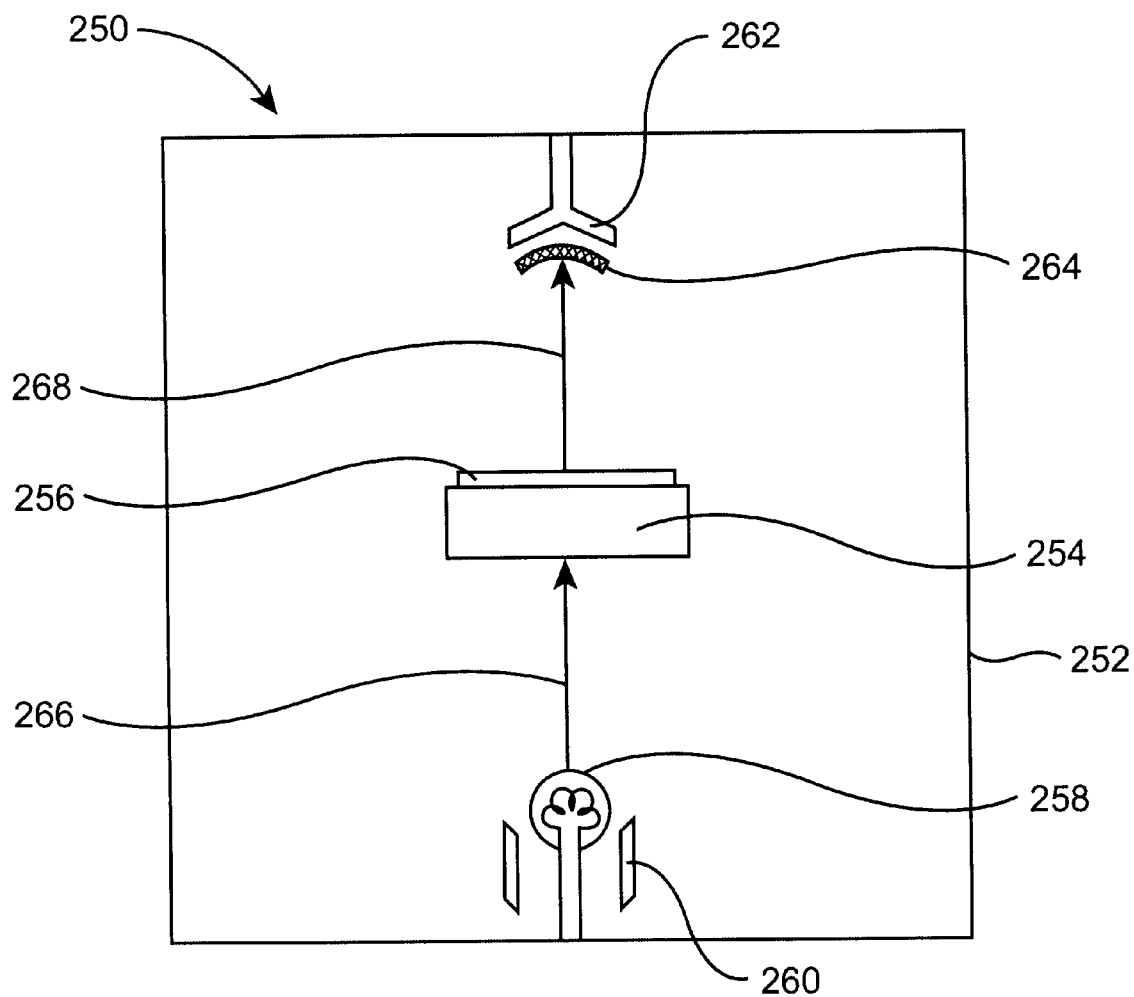
FIG. 2B shows another endpoint detection apparatus, which detects a transmitted radiation signal, according to another embodiment of the present invention.

FIG. 2B shows another endpoint detection apparatus 250, according to another embodiment of the present invention, which measures the transmitted radiation signal through the IC substrate surface. Apparatus 250 includes a housing 252 having a chuck 254, which is capable of securing an IC substrate 256, positioned above a radiation source 258 fitted with deflectors 260 and below a transmitted radiation signal detector 262. Similar to apparatus 200 of FIG. 2A, a band pass filter 264 is positioned between substrate 256 and deflectors 260 for filtering the ambient noise in the transmitted radiation signal level during detection.

It is important to note that although components of apparatuses 200 of FIG. 2A and 250 of FIG. 2B function substantially similarly, they are configured to detect different kinds of radiation signals, i.e. apparatus 200 detects reflected signals and apparatus 250 detects transmitted signals. In apparatus 200, radiation source 208 along with deflectors 210 are positioned above the substrate surface to generate incident radiation 216 that reflects from the surface of substrate 206 to produce reflected radiation signal 218, which is detected by detector 212 also positioned above the substrate surface. In apparatus 250, however, radiation source 258 along with deflectors 260 are positioned below the active surface of substrate 256 such that incident radiation 266 directed upon a surface, which is opposite to the active surface, is transmitted as a transmitted radiation signal 268 through the substrate 256 and detected by detector 262. The present invention, therefore, provides the flexibility of either measuring the reflected or the transmitted radiation signal.

In the apparatuses of FIGS. 2A and 2B, radiation sources 208 and 258 include radiation generating devices such as infrared radiation lamps and halogen lamps. In a preferred embodiment, however, the radiation source of the present invention includes Sylvania type FEL lamp, which is commercially available from Osram Sylvania Inc., of Danvers, Mass. The Sylvania type FEL lamp generally operates at a power of about 1000 watts and generates wavelengths that are between about 1.5 and about 14 micrometers (am). Radiation detectors may include detectors that are employed to detect infrared radiation. By way of example, radiation detectors may include FD1000W2.2 and FD1000W2.5 detectors, which are commercially available from Fermionics Corporation, of Simi Valley, Calif.

Deflectors 210 and 260 may include materials well known in the art, such as well known standard reflectors with gold, silver or aluminum. In one preferred embodiment, the deflectors employed in the present invention may include a Second Surface Silver Reflectors, which are commercially available from Optical Components Inc. of Covina, Calif. because it eliminates almost all reflectivity losses during radiation deflection in the near-infrared region. Band pass filters 214 and 264 may include any of the custom filters commercially available from Optical Components Inc. mentioned above.

Integrated circuit substrates 206 and 256 preferably include a semiconductor wafer. Chuck 204 of FIG. 2A is typically made of aluminum. Chuck 254 of FIG. 2B, however, includes a material that allows radiation to pass therethrough, so that radiation may ultimately be transmitted through the overlying substrate. By way of example, chuck 254 may include glass with good transmission in a wavelength regime of between about 0.32 and about 2.5 $\mu$m or magnesium oxide with good transmission in a wavelength regime of between about 0.36 and about 5.35 $\mu$m.

The endpoint detection apparatuses described above may be employed when CMP has concluded, as determined by the motor current measuring mechanism, and the substrate is completely dry. According to one embodiment of the present invention, the apparatuses may be employed after the substrate is cleaned and dried in a wafer scrubber system. In one preferred embodiment, the apparatuses of the present invention may be employed after the substrate is cleaned and dried in a DSS 200 Series 2 Wafer Scrubber System, commercially available from OnTrak, of San Jose, Calif. In this embodiment, after a substrate is cleaned and dried in the wafer scrubber system, the substrate is automatically displaced by a robotic arm from the wafer scrubber system and secured on the chuck of apparatus 200 (of FIG. 2A) or 250 (of FIG. 2B) so that detection of residual metal according to the present invention may be carried out.

Figure 3:
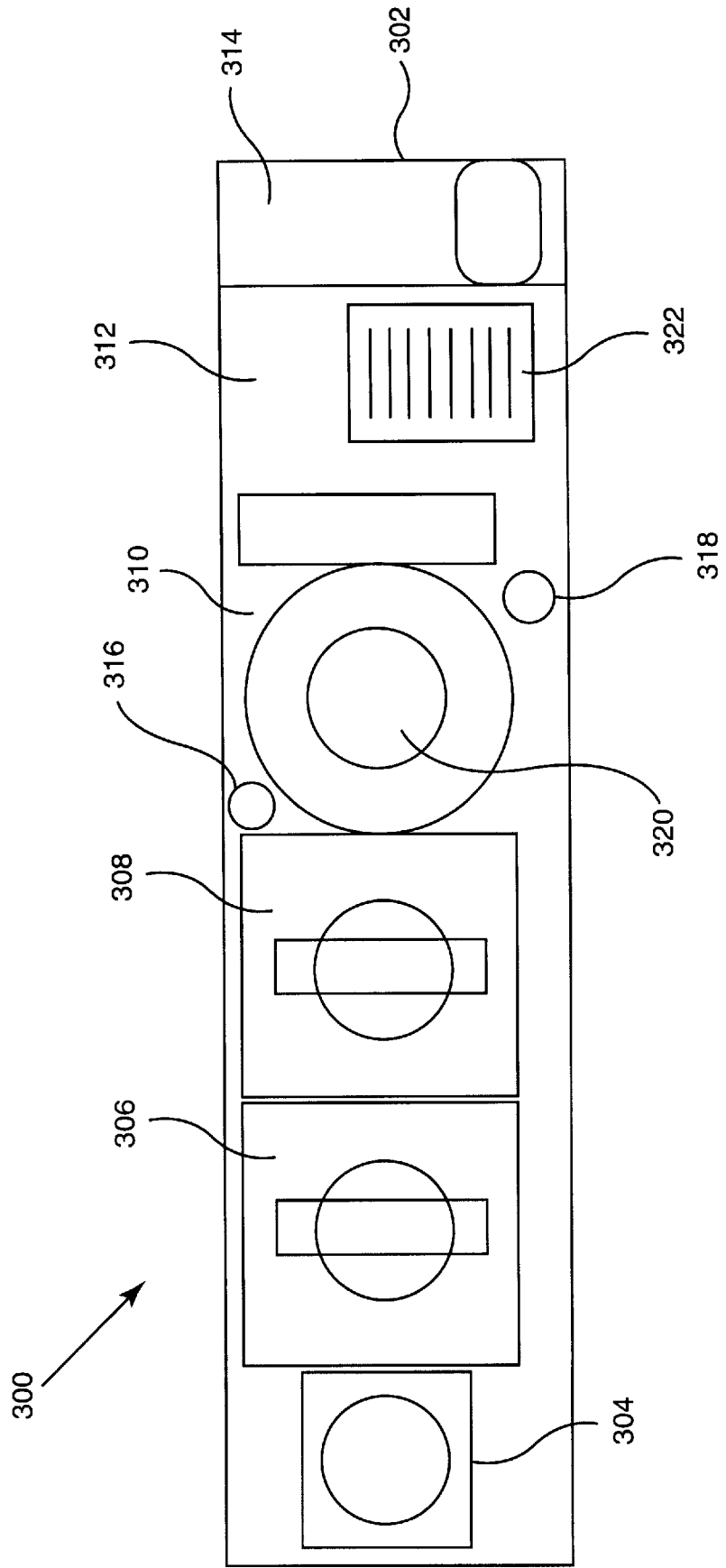
FIG. 3 shows an example of a modified wafer scrubber system into which certain components of the apparatus of FIG. 2A are integrated.

In another embodiment of the present invention, the apparatuses shown in FIGS. 2A and 2B can be integrated into the wafer scrubber system with minor modifications. By way of example, FIG. 3 shows major components of a modified DSS 200 Series 2 Wafer Scrubber System 300 (hereinafter referred to as "modified wafer scrubber system 300"), which has integrated into it the apparatus of FIG. 2A. Modified wafer scrubber system 300 includes a housing 302 containing a wet send indexer 304, a primary chamber 306, a secondary chamber 308, a spin, rinse, dry station 310, a receiver station 312, and a user interface electronics assembly 314. Spin rinse dry station 310 further includes a chuck 320, a radiation source 316 and a reflected radiation signal detector 318. Those skilled in the art will appreciate that deflectors (not shown to simplify illustration) and band pass filters (not shown to simplify illustration) may also be placed inside the spin, rinse, dry station as shown in FIG. 2A.

Before detection of residual metal, according to the present invention is carried out in modified wafer scrubber system 300, the substrate is cleaned and dried after CMP. The cleaning process may begin in wet send indexer 304, where the wafers are maintained in a water bath. Particle contaminants from the slurry and/or from the eroded material may then be removed from the substrate surface in primary chamber 306 by scrubbing the substrate surface with brushes (not shown to simplify illustration) in the presence of ammonium hydroxide. Next, in secondary chamber 308, chemical contaminants from the slurry that may have penetrated a substrate layer during CMP are removed from the substrate surface by scrubbing the substrate surface again with brushes (not shown to simplify illustration) in the presence of appropriate cleaning mixtures. The chemicals used to clean the substrate surface in primary and secondary chambers 306 and 308 are then removed in spin, rinse, dry station 310.

During a typical spin, rinse, dry cycle the substrate is secured on a chuck and sprayed with water to rinse off the chemicals on the substrate surface. Next, the chuck switches to a high speed rotation as heat is added to the spin, rinse, dry station. The rotation literally throws the water off the substrate surface. The substrate surface is then dried by the radiant heat that may be generated by bright lights (not shown to simplify illustration) mounted on top of the spin, rinse, dry station.

Once chuck 320 stops spinning and the substrate is completely dry, radiation source 316 is automatically energized to illuminate the active surface of the substrate. The resulting reflected radiation signal is then detected by reflected radiation signal detector 318 to determine the presence of residual metal according to present invention. Of course, those skilled in the art will recognize that the wafer scrubber system described above may be similarly modified to include the endpoint detection apparatus 250, as shown in FIG. 2B. In this configuration, the radiation source and the deflectors are positioned below the substrate in the spin, rinse, dry station.

After endpoint detection according to the present invention has concluded, a robotic arm displaces the substrate from chuck 320 and transports it to a cassette 322 in receiver station 312. Cassette 322 has several slots, which are capable of holding several IC substrates. If the presence of residual metal regions are identified on the substrates, then such substrates are subjected to CMP again and the process may be repeated until no residual metal regions are present. All automated movements, such as rotation of chuck 320, energizing radiation source 316, movement of brushes inside primary and secondary chambers 306 and 308 and movement of robotic arms, etc. inside the wafer scrubber system are carried out by user interface electronics assembly 314.

Figure 4:
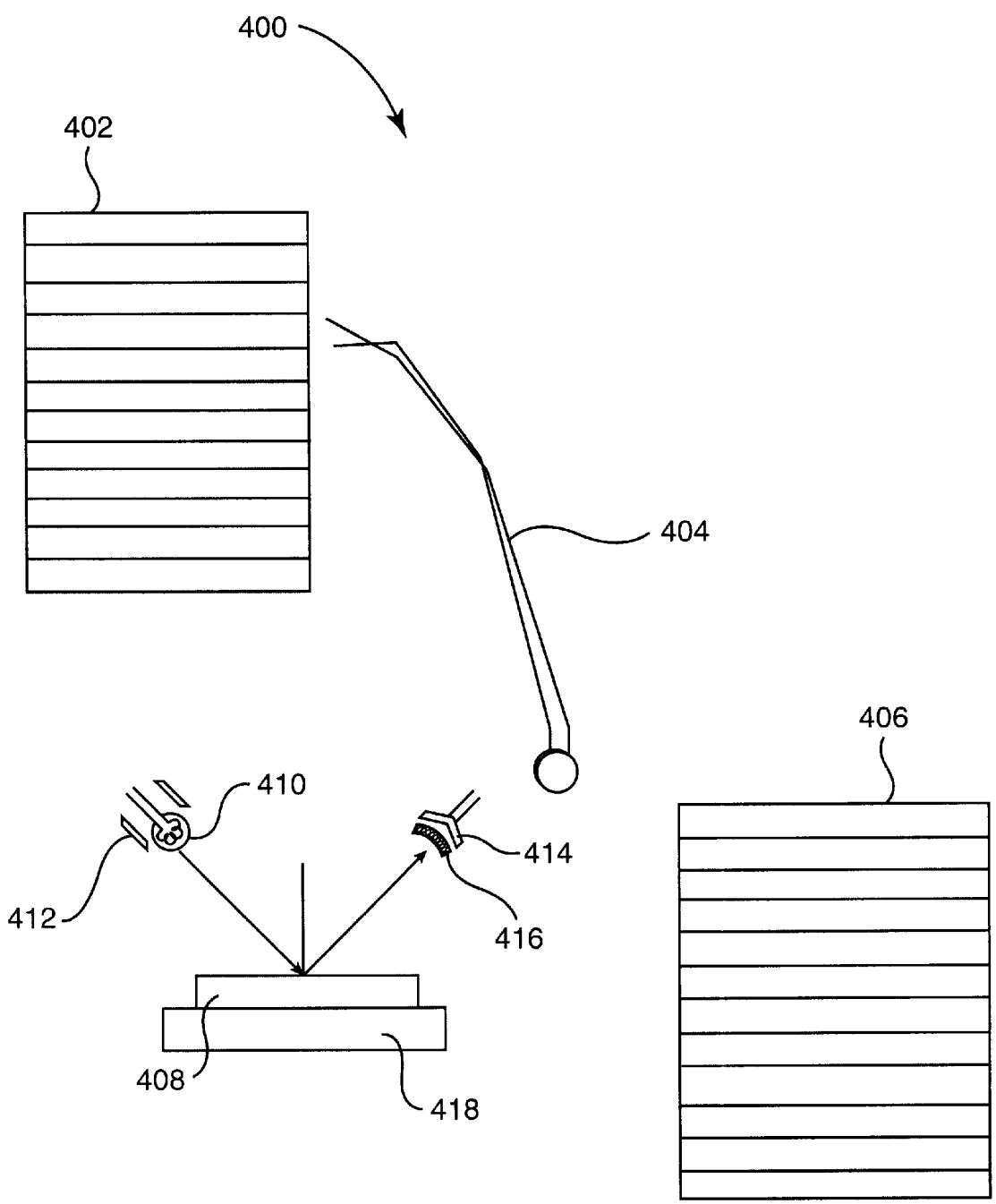
FIG. 4 shows an example of how the apparatus of FIG. 2A may be integrated into a post CMP process, during which detection for residual metal is carried out when a robotic arm transfers wafers from one cassette to another cassette.

In yet another embodiment of the present invention, an endpoint detection apparatus 400 shown in FIG. 4 may be employed in those IC fabrication applications where the substrates are not completely dried after CMP. Apparatus 400 includes a first cassette 402 for storing wet substrates, a robotic arm 404, a chuck 418 capable of securing an IC substrate 408, a radiation source 410 fitted with deflectors 412, a reflected radiation signal detector 414, a band pass filter 416 and a second cassette 406. First and second cassettes 402 and 406 have slots, similar to cassette 322 of FIG. 3, to hold several substrates.

Before detection of residual metal begins, the wet substrates in first cassette 402 are dried completely. Those skilled in the art will recognize that drying of the substrates can be accomplished in a number of ways. By way of example, first cassette 402 may be placed in a chamber equipped with heating lamps to completely dry all the substrates stored in first cassette 402. Robotic arm 404 then places one of the dried substrates on chuck 418, where the substrate is illuminated by radiation source 410 and a resulting reflected radiation signal is detected by reflected radiation signal detector 414. Deflectors 412 and band pass filter 416 function as described above. Those skilled in the art will recognize that with minor modifications, e.g., by positioning radiation source 410 and deflectors 412 below the substrate as shown in apparatus 250 of FIG. 2B, apparatus 400 can be used for detecting a transmitted radiation signal as well.

Figure 5:
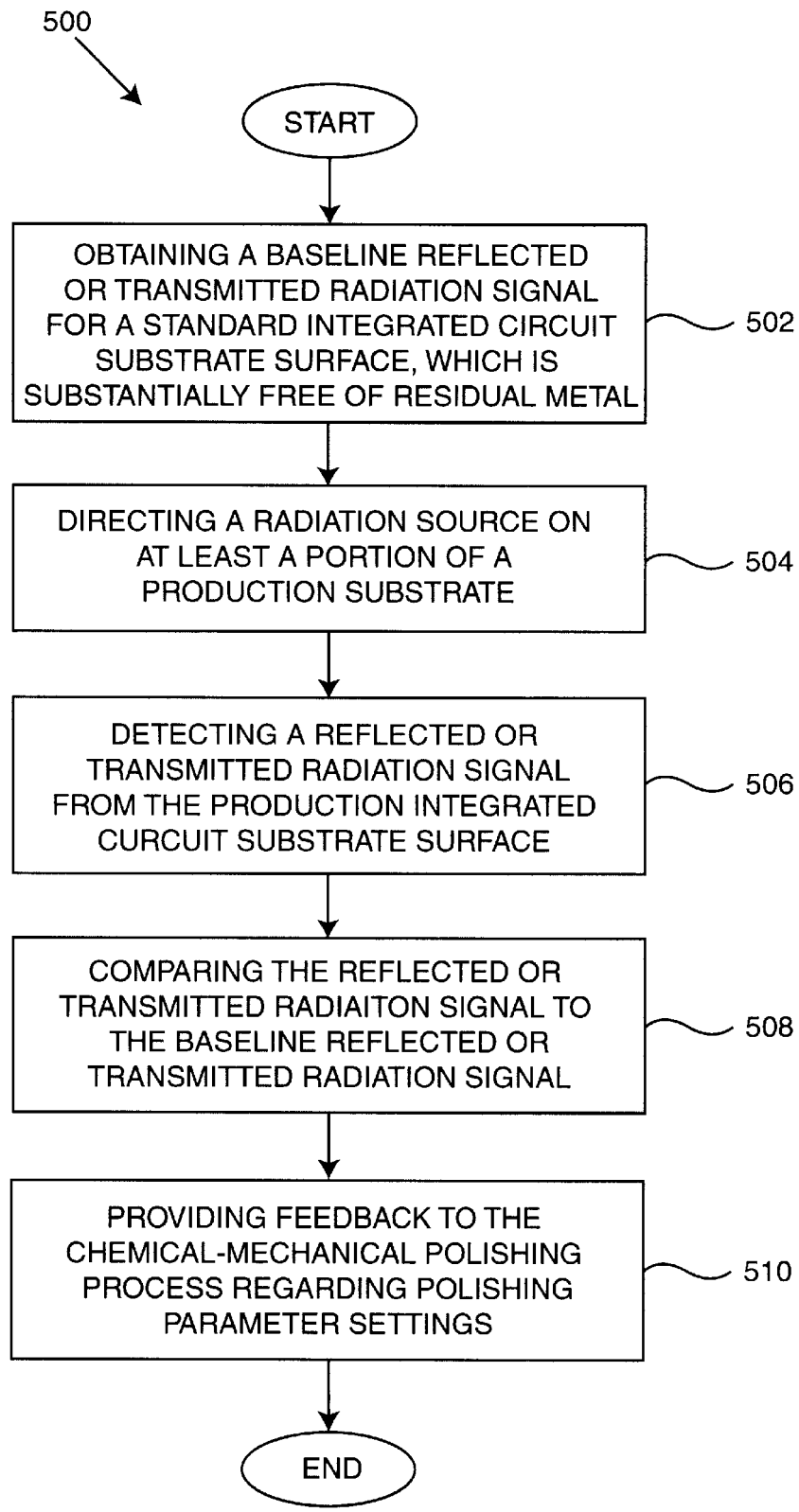
FIG. 5 is a flowchart of an endpoint detection process, according to one embodiment of the present invention, for chemical-mechanical polishing.

FIG. 5 shows an endpoint detection process 500, according to one embodiment of the present invention, to determine the endpoint of CMP of a production IC substrate (hereinafter referred to as "production substrate"). As used in connection with the description of the invention, the term "production substrate" means IC substrates of a production lot that may ultimately be sold. Any endpoint detection apparatus that includes radiation sources and detectors may be employed to carry out endpoint detection process 500 according to the present invention. In preferred embodiments of the present invention, however, the apparatuses 200 (of FIG. 2A), 250 (of FIG. 2B), 300 (of FIG. 3), and 400 (of FIG. 4) are implemented to carry out process 500.

Endpoint detection process 500 of the present invention begins with a step 502, which includes obtaining a baseline reflected or transmitted radiation signal associated with a standard IC substrate (hereinafter referred to as "standard substrate") surface. As used in connection with the description of the invention, the term "standard substrate" means an IC substrate that is substantially free of residual metal. The standard substrate serves to provide a baseline or a reference transmitted or reflected radiation signal, against which the transmitted or reflected radiation signal of production substrates can be compared.

The baseline reflected or transmitted radiation signal can be obtained by employing the apparatus of FIG. 2A or 2B, for example. After the standard surface is secured on the chuck, the radiation source is then energized to illuminate the standard substrate surface and a resulting reflected or transmitted radiation signal then detected, measured and stored as a baseline reflected or transmitted radiation signal. In one embodiment of the present invention, step 502 may be carried out and stored before production substrates undergo CMP.

In order to provide a precise baseline reflected or transmitted radiation signal, the standard substrate preferably includes the various layers, e.g., dielectric and metallization layers, underlying the residual metal regions in the production substrate, disposed atop a silicon substrate layer. In obtaining the baseline reflected radiation signal, the radiation incident upon the surface of a standard substrate is reflected off the substrate surface at a much lower rate because the standard substrate layer includes silicon that is free of residual metal. The baseline reflected radiation signal of the standard substrate primarily accounts for the presence of metal interconnects and metallization layers, which may similarly be present in the production substrate. The baseline reflected radiation signal, therefore, serves as the baseline or reference reflected radiation signal. The standard substrate, in the case of obtaining the transmitted radiation signal, however, allows some of the radiation incident upon it to pass therethrough, particularly through the nonmetal regions. The nonmetal regions in the standard substrate exclude those regions where metallization for forming interconnects and conductive lines is present. The detector, therefore, detects the transmitted radiation signal through the nonmetal region and provides the baseline or reference transmitted radiation signal.

Next, a step 504 includes directing a radiation source on at least a portion of a production substrate surface. By way of example, this may be accomplished by using the radiation sources described in the apparatuses shown in FIGS. 2, 2A, 3 and 4. A step 506 then includes detecting and measuring the resulting reflected or transmitted radiation signal from the production substrate surface. Steps 504 and 506 are relatively fast, i.e. a period of time required to complete steps 504 and 506 is in the order of a few milliseconds.

Next, in a step 508, the reflected or transmitted radiation signal of the production substrate obtained in step 506 is compared to the baseline reflected or transmitted radiation signal stored in step 502. In the case of measuring the reflected signal, detection of a higher radiation signal for the production substrate than the baseline reflected radiation signal of the standard substrate indicates the presence of residual metal regions on the production substrate. As mentioned above, such a production substrate undergoes CMP until substantially all of the residual metal is removed. In situations where the endpoint detection apparatus is configured to detect a transmitted radiation signal, the presence of residual metal regions is detected if the transmitted radiation signal of the production substrate is lower than the baseline transmitted radiation signal of the standard substrate. Of course if residual metal regions are detected, the production substrate undergoes additional CMP.

While intending not to be bound by theory, the present invention recognizes that radiation incident upon a production substrate with residual metal will reflect off the those portions of the production substrate surface that have metal and residual metal and will be substantially transmitted through or reflected off at a much lower rate from those portions of the production substrate that are free of metal. For a production substrate, the reflected radiation detector of FIG. 2A, for example, will detect a reflected radiation signal that is proportional to the amount of metal present on the substrate surface. The portion of the reflected radiation signal of the production substrate that is attributed to the presence of metallization to form interconnects or conductive lines, for example, is substantially similar to the baseline reflected radiation signal of the standard substrate. The presence of residual metal will, however, produce a higher reflected radiation signal than the baseline reflected radiation signal.

The transmitted radiation signal detector of FIG. 2B, however, will detect a weaker transmitted signal for the same production substrate with residual metal. This is because the radiation that is incident on the surface that is opposite the active substrate surface will travel through the production substrate and then reflect off those portions of the substrate that have metal, e.g., residual metal as well as metallization to form conductive lines and interconnects. Hence only a portion of the radiation incident on the production substrate passes through the substrate, producing a relatively lower reflected radiation signal. The reduction in the transmitted radiation signal due to the presence of metallization to form conductive lines and interconnects, for example, is quantified by the baseline transmitted radiation signal of the standard substrate. Thus, upon comparing the transmitted radiation signal of the production substrate to the baseline transmitted radiation signal of the standard substrate (determined in step 502 of FIG. 5), the presence of residual metal on the production substrate can be determined in accordance with one embodiment of the present invention.

Finally, a step 510 includes providing immediate feedback to the CMP process regarding polishing parameters, e.g., polishing time for each production substrate, pressure applied by the production substrate against the polishing pad during CMP, etc. In this step, the feedback provided to the CMP process depends on the measurements made by the radiation detector, e.g., the amount of residual metal present on the production substrate or where most of the residual metal is located. Thus, step 510 almost instantly addresses any corrections that need to be made to the CMP process. Steps 508 and step 510 may be carried out by any suitable computer systems. In the embodiment of FIG. 3, such a computer system may be integrated into user interface electronics assembly 314 of FIG. 3.

Suitable computer systems for use in implementing and controlling the automated methods in the present invention, e.g., energizing radiation sources or activating detectors, storing baseline reflected or transmitted radiation signals, comparing baseline signals to actual signals from production substrates, movement of robotic arms in the wafer scrubber system of FIG. 3 and in the apparatus of FIG. 4, etc., may be obtained from various vendors. In one preferred embodiment, an appropriately programmed HP735 workstation (Hewlett Packard, Palo Alto, Calif.) or Sun ULTRASPARC or Sun SPARC (Sun Microsystems, Sunnyvale, Calif.) may be employed in an IBM PC based system.

It should be understood that the present invention also relates to machine readable media on which are stored instructions for implementing the invention. Such instructions facilitate the comparison of the reflected or transmitted radiation signals of the production substrate to the baseline reflected or transmitted radiation signals of the standard substrate and the provision of feedback to the CMP process regarding the various polishing parameter settings based on a certain predetermined criteria. Such media includes, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

The endpoint detection processes of the present invention represents a marked improvement over the current endpoint detection processes. By way of example, the present invention essentially requires a radiation source and a detector, which are relatively inexpensive and easy to implement. Such equipment can be easily integrated into post CMP cleaning equipment, e.g. wafer scrubber systems as shown in FIG. 3, with minor modifications. The automated features of the present invention also eliminate the need for an operator for monitoring the inspection process. As another example, detecting for residual metal regions according to the present invention requires only a few milliseconds compared to about 4 minutes/wafer required for a 200 mm wafer in current endpoint detection processes. As yet another example, because the time required for detecting residual metal regions is significantly shortened, the feedback time for the CMP process in the present invention is drastically reduced compared to current processes.

Although the foregoing invention has been described in some detail for purposes of clarity of understanding, it will be apparent that certain changes and modifications may be practiced within the scope of the appended claims. For example, while the specification has described in terms chemical-mechanical polishing, there is in principle no reason why features of this invention cannot be adapted or implemented for detecting the amount of metal on an integrated circuit substrate surface in other applications. Therefore, the present embodiments are to be considered as illustrative and not restrictive, and the invention is not to be limited to the details given herein, but may be modified within the scope of the appended claims.

What is claimed is:

1. An automated endpoint detection process for detecting residual metal on a surface of an integrated circuit substrate after subjecting said surface to a chemical-mechanical polishing process, comprising:

obtaining a baseline reflected radiation signal for a surface on a standard integrated circuit substrate surface that is substantially free of residual metal;

directing radiation generated from a radiation source on at least a portion of said surface of said integrated circuit substrate;

detecting a reflected radiation signal from said surface of said integrated circuit substrate; and comparing said reflected radiation signal to said baseline reflected radiation signal and thereby determining whether residual metal is present on said surface of said integrated circuit substrate.

2. The process of claim 1, further comprising subjecting the surface of the integrated circuit substrate to an additional chemical-mechanical polishing process, if the reflected radiation signal is higher than the baseline reflected radiation signal.

3. The process of claim 1, further comprising providing feedback to the chemical-mechanical polishing process for polishing parameter settings after the step of comparing the reflected radiation signal to the baseline reflected radiation signal.

4. The process of claim 1, wherein the step of comparing the reflected radiation signal to the baseline radiation signal is facilitated by a computer system.

5. The process of claim 1, wherein the step of obtaining a baseline radiation signal is conducted before the chemical-mechanical polishing process.

6. The process of claim 1, wherein the radiation source comprises an infrared radiation source and the step of detecting comprises using a radiation detector that includes an infrared radiation detector.

7. The process of claim 1, further comprising drying the surface of the integrated circuit substrate in a spin, rinse, dry station of a wafer scrubber before the step of directing radiation is carried out.

8. The process of claim 7, wherein the step of directing is carried out by automatically energizing the radiation source in the spin, rinse, dry station of the wafer scrubber, where the integrated circuit substrate is secured on a chuck.

9. The process of claim 1, wherein the steps of directing and detecting require a period of time that is on the order of a few milliseconds.

10. The process of claim 1, wherein a robotic arm secures the integrated circuit substrate while the steps of directing and detecting are carried out.

11. The process of claim 10, wherein the robotic arm transfers the integrated circuit substrate from one cassette containing a plurality of substantially dry integrated circuit substrates to a second cassette for holding a plurality of integrated circuit substrates.

12. The process of claim 1, wherein the integrated circuit substrate comprises a semiconductor wafer.

13. The process of claim 1, wherein the step of obtaining a baseline reflected radiation signal comprises providing radiation to the surface of the standard integrated circuit substrate that is substantially free of residual metal;

detecting the baseline reflected radiation signal from the surface of the integrated circuit substrate; and storing the baseline reflected radiation signal from the surface of the integrated circuit substrate on machine readable media.

14. An automated endpoint detection process for detecting residual metal on a surface of an integrated circuit substrate after subjecting said surface to a chemical-mechanical polishing process, comprising:

obtaining a baseline transmitted radiation signal for a standard integrated circuit substrate that is substantially free of residual metal;

transmitting radiation through said integrated circuit substrate, said radiation generated by a radiation source;

detecting a transmitted radiation signal from an active surface of said integrated circuit substrate; and comparing said transmitted radiation signal to said baseline transmitted radiation signal and thereby determining whether residual metal is present on said surface of said integrated circuit substrate.

15. The process of claim 14, wherein the radiation source comprises an infrared radiation source and the step of detecting comprises employing a detector which includes an infrared radiation detector.

16. The process of claim 14, wherein the infrared radiation source is positioned below the active surface of the integrated circuit substrate such that radiation directed at a surface opposite to the active surface of the integrated circuit is transmitted through the integrated circuit substrate.

17. The process of claim 14, wherein the integrated circuit substrate comprises a semiconductor wafer.

18. The process of claim 14, further comprising subjecting the surface of the integrated circuit substrate to an additional chemical-mechanical polishing process, if the transmitted radiation signal is lower than the baseline transmitted radiation signal.

19. The process of claim 14, wherein the step of obtaining the baseline transmitted radiation signal comprises:

directing radiation to a surface of the standard integrated circuit substrate that is opposite to an active surface of the standard integrated circuit substrate, said surface being substantially free of residual metal;

detecting the baseline transmitted radiation signal through said surface of the integrated circuit substrate; and storing the baseline transmitted radiation signal through said surface of the integrated circuit substrate on machine readable media.

20. An apparatus for detecting residual metal on an integrated circuit substrate, comprising:

a housing;

a radiation source for generating radiation on at least a portion of an active surface of the integrated circuit substrate, said radiation source positioned inside the housing;

a radiation detector for detecting a reflected or transmitted radiation signal from the substrate surface, said radiation detector is appropriately positioned inside the housing to detect the reflected or transmitted radiation signal from said active surface of said substrate; and a system for comparing the reflected or transmitted radiation signal from the substrate surface with a baseline reflected radiation signal from the substrate surface with a baseline reflected radiation signal for a surface of a standard integrated circuit substrate surface that is substantially free of residual metal, to thereby determine whether residual metal is present on said surface of said integrated circuit substrate.

21. The apparatus of claim 20, wherein the housing comprises a spin, rinse, dry station.

22. The apparatus of claim 20, wherein the radiation source and the radiation detector are appropriately positioned above the active surface of the integrated circuit substrate such that radiation incident upon the active surface reflects off the substrate surface and the resulting reflected radiation signal is detected by the radiation detector.

23. The apparatus of claim 20, wherein the radiation source is appropriately positioned below the active surface of the integrated circuit substrate such that radiation incident upon a surface opposite to the active surface of the integrated circuit substrate is transmitted through the active surface of the integrated circuit substrate and the transmitted radiation signal is detected by the radiation detector.

24. The apparatus of claim 20, further comprising a band pass filter positioned between the integrated circuit substrate and the detector such that a reflected or transmitted radiation signal passes through the band pass filter before reaching the detector.

25. The apparatus of claim 20, further comprising deflectors appropriately positioned at sides of the radiation source such that a substantial amount of radiation from the radiation source is incident upon the integrated circuit substrate.

26. The apparatus of claim 20, further comprising a user interface electronics assembly for automatically energizing the radiation source.

27. An apparatus for detecting residual metal on an integrated circuit substrate, comprising:

a housing;

means for generating radiation on at least a portion of an active surface of the integrated circuit substrate, said means for generating radiation being positioned inside said housing;

means for detecting a reflected or transmitted radiation signal from said active surface of said substrate, said means for detecting being appropriately positioned inside the housing to detect the reflected or transmitted radiation signal from said active surface of said substrate; and means for comparing the reflected or transmitted radiation signal from the active surface of the substrate with a baseline reflected radiation signal from a surface of a standard integrated circuit substrate surface that is substantially free of residual metal, to thereby determine whether residual metal is present on the surface of the integrated circuit substrate.

28. The apparatus of claim 27, wherein the housing comprises a spin, rinse, dry station.

29. The apparatus of claim 27, wherein the means for generating and the means for detecting are appropriately positioned above the active surface of the integrated circuit substrate such that radiation incident upon the active surface reflects off the active surface and the resulting reflected radiation signal is detected by the means for detecting.

30. The apparatus of claim 27, wherein the means for generating radiation is appropriately positioned below the active surface of the integrated circuit substrate such that radiation incident upon a surface opposite to the active surface of the integrated circuit substrate is transmitted through the active surface of the integrated circuit substrate and the transmitted radiation signal is detected by the means for detecting.

31. The apparatus of claim 27, further comprising means for filtering the reflected or transmitted radiation signal before the reflected or transmitted radiation signal reaches the means for detecting.

32. The apparatus of claim 27, further comprising means for deflecting the radiation generated from the means for generating such that a substantial amount of radiation is incident upon the integrated circuit substrate.

* * * * *